United States Patent
McCarthy, III et al.

(10) Patent No.: US 10,063,641 B2
(45) Date of Patent: Aug. 28, 2018

(54) SYSTEMS AND METHODS FOR FINDING WIRELESS SIGNALS SUFFICIENT FOR INSTALLATION OF WIRELESS HOME AUTOMATION DEVICES

(71) Applicant: EchoStar Technologies L.L.C., Englewood, CO (US)

(72) Inventors: Bernard A. McCarthy, III, Sandy Springs, GA (US); David B. Lett, Duluth, GA (US); George Horkan Smith, Brookhaven, GA (US); Allan Richard Bly, Jr., Marietta, GA (US)

(73) Assignee: EchoStar Technologies International Corporation, Englewood, CO (US)

( * ) Notice: Subject to any disclaimer, the term of this patent is extended or adjusted under 35 U.S.C. 154(b) by 0 days.

(21) Appl. No.: 15/280,804

(22) Filed: Sep. 29, 2016

(65) Prior Publication Data

US 2018/0091598 A1 Mar. 29, 2018

(51) Int. Cl.

| H04W 88/12 | (2009.01) |
|---|---|
| H04L 12/28 | (2006.01) |
| H04L 29/08 | (2006.01) |
| H04W 4/00 | (2018.01) |
| H04L 29/12 | (2006.01) |
| H04W 4/80 | (2018.01) |

(52) U.S. Cl.
CPC ........ *H04L 67/125* (2013.01); *H04L 12/2803* (2013.01); *H04L 61/6081* (2013.01); *H04L 67/02* (2013.01); *H04W 4/008* (2013.01); *H04W 4/80* (2018.02)

(58) Field of Classification Search
CPC . H04L 12/28; H04L 12/2803; H04L 12/2829; H04W 4/00; H04W 4/005; H04W 4/008; H04W 76/02; H04W 76/023; H04W 88/12; H04W 76/00; H04W 84/10; H04W 84/12; H04W 88/16
See application file for complete search history.

(56) References Cited

U.S. PATENT DOCUMENTS

| 6,791,467 | B1 * | 9/2004 | Ben-Ze'ev | ............. G08C 19/28 |
| | | | | 340/12.25 |
| 8,069,351 | B2 * | 11/2011 | Stefanik | ............ H04M 1/72519 |
| | | | | 341/173 |
| 9,355,511 | B2 * | 5/2016 | Hogan | ............... G07C 9/00174 |
| 9,590,857 | B2 * | 3/2017 | Lee | ......................... H04L 45/02 |

(Continued)

*Primary Examiner* — Blane Jackson
(74) *Attorney, Agent, or Firm* — Seed IP Law Group LLP

(57) ABSTRACT

Various embodiments provide a systems and methods for finding wireless signals sufficient for installation of wireless home automation devices. Before such home automation devices are installed, or during the process of installing such home automation devices, the remote-control device of a wireless home automation hub may detect whether a suitable wireless signal is able to be received from the home automation hub or from a wireless repeater device at various locations on the customer premises and indicate that on the remote-control device. The remote control device may continue to display such an indication regarding the signal, or lack thereof, as the user moves about the customer premises with the remote control. In this manner, the user may find what locations on the customer premises are suitable for installation of home automation devices to communicate wirelessly with the home automation hub.

21 Claims, 8 Drawing Sheets

(56) References Cited

U.S. PATENT DOCUMENTS

2016/0132031 A1* 5/2016 Kozura ............... H04L 12/2832
                                                    700/275
2017/0134182 A1* 5/2017 Davis ................. H04L 12/2829
2017/0163525 A1* 6/2017 Fedor ..................... H04L 45/28
2017/0171314 A1* 6/2017 Britt ..................... H04W 4/008

* cited by examiner

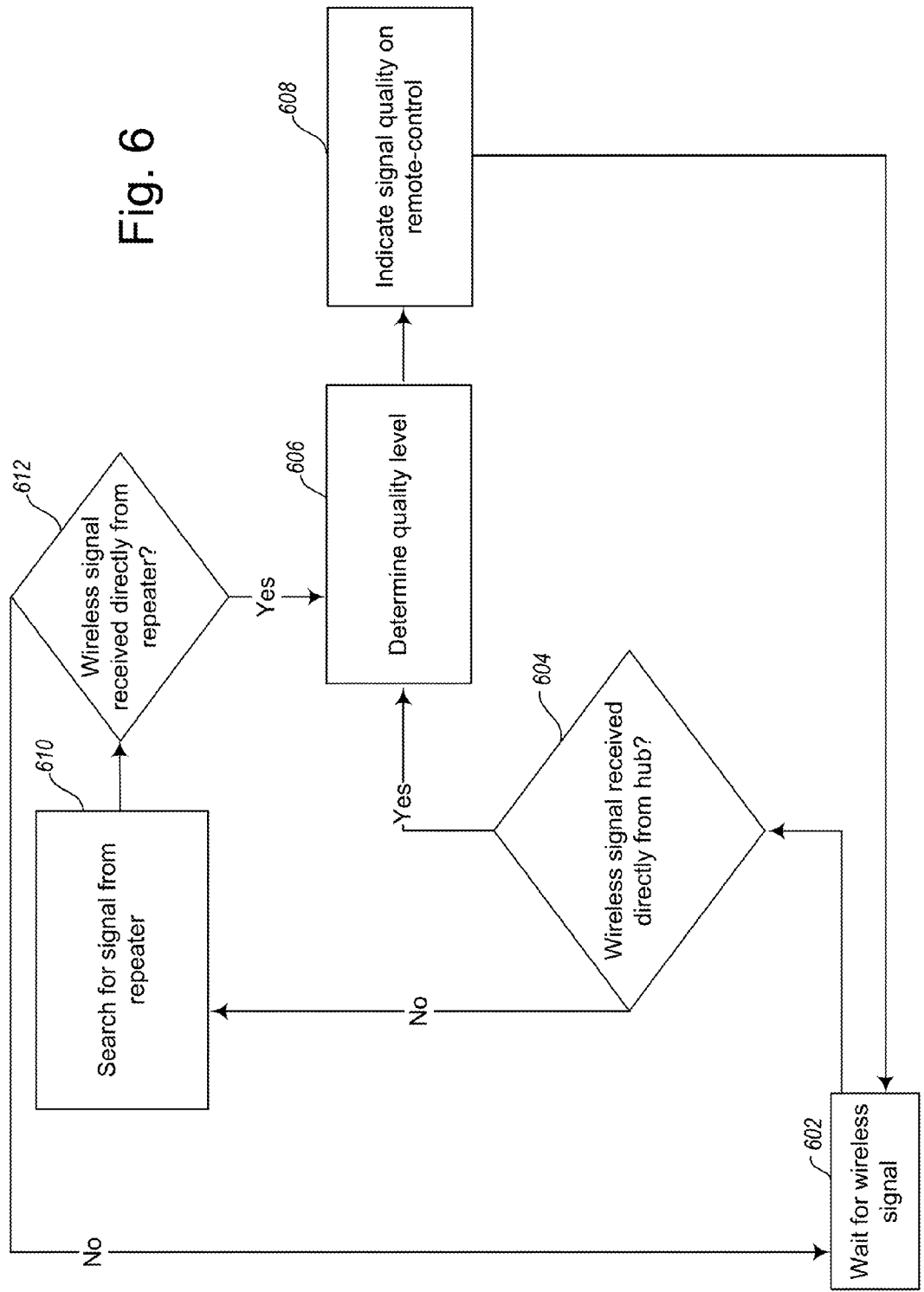

US 10,063,641 B2

SYSTEMS AND METHODS FOR FINDING WIRELESS SIGNALS SUFFICIENT FOR INSTALLATION OF WIRELESS HOME AUTOMATION DEVICES

TECHNICAL FIELD

The technical field relates to home automation systems, and more particularly, to apparatuses, systems and methods for finding wireless signals sufficient for installation of home automation devices.

BRIEF SUMMARY

Configuration, control and management of wireless home automation devices within a wireless home automation system may be performed by a wireless home automation hub. The home automation hub interconnects wirelessly to one or more home automation devices. The home automation hub receives various commands wirelessly from a remote-control device. These commands control the home automation hub which in turn configures, controls and manages the wireless home automation devices. For example, the home automation hub may send a signal to turn off or turn down the lights, turn up or down the temperature setting on a thermostat, initiate a security camera to turn on or start recording, or perform various other home automation functions. Such home automation functions may be performed based on a set of conditions or rules implemented by the home automation hub.

A wireless signal of sufficient quality is desirable in order to install wireless home automation devices within the home automation system on the customer premises if they are to communicate wirelessly with and be configured, controlled and managed by the home automation hub. Therefore, before such home automation devices are installed, or during the process of installing such home automation devices, the remote-control device of the home automation hub may detect whether such a wireless signal is able to be received at various locations on the customer premises and indicate that for the user on the remote-control device. The remote control device may continue to display such an indication regarding the signal, or lack thereof, as the user moves about the customer premises with the remote control. In this manner, the user may find which locations on the customer premises are suitable for installation of home automation devices to communicate wirelessly with the home automation hub. In some embodiments, the remote-control performs its own pairing process with the home automation hub before performing the wireless signal detection.

The remote-control device may be configured to not only detect whether such a wireless signal is able to be received from the home automation hub, but also determine the wireless signal quality, e.g., the strength of the signal, the consistency of the signal and other qualities of the signal. The remote-control device may then determine whether the signal quality is such that if a home automation device were to be installed on the customer premises at the current location of the remote-control device, the home automation hub would be able to communicate with and control the home automation device over the applicable wireless communication channel. This may be indicated by an indicator on the remote control device that indicates whether the signal quality is sufficient. In some embodiments, a measurement of the wireless signal strength, strength and/or consistency is presented on the remote-control device.

BRIEF DESCRIPTION OF THE DRAWINGS

The components in the drawings are not necessarily to scale relative to each other. Like reference numerals designate corresponding parts throughout the several views.

FIG. 6 is a flow diagram of a process for finding wireless signals sufficient for installation of home automation devices provided by a third example embodiment.

DETAILED DESCRIPTION

Figure 1A:
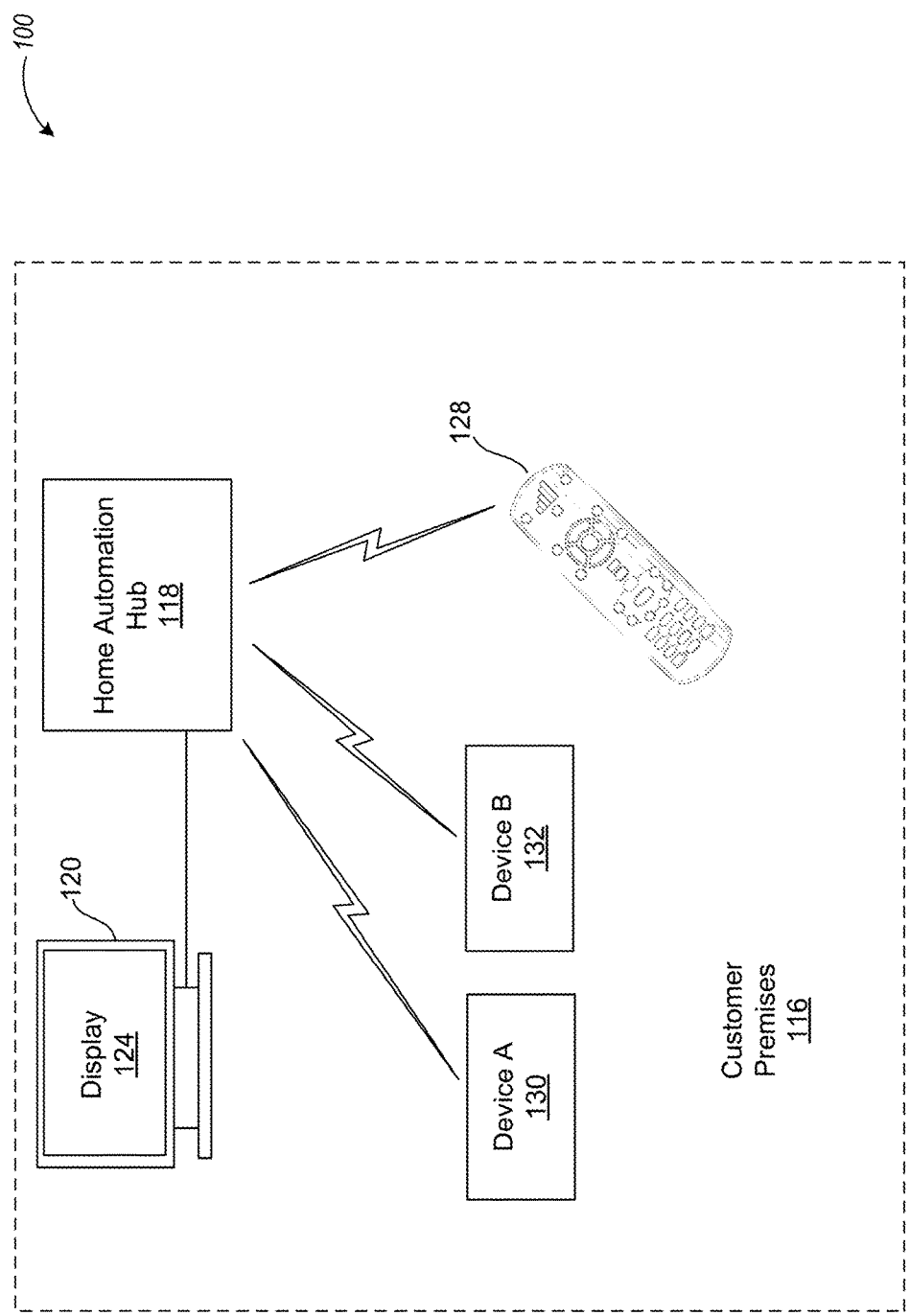
FIG. 1A is a block diagram illustrating an example environment in which various embodiments of systems and methods for finding wireless signals sufficient for installation of home automation devices may be implemented.

FIG. 1A is an overview block diagram illustrating an example environment 100 in which various embodiments of systems and methods for finding wireless signals sufficient for installation of home automation devices may be implemented. It is to be appreciated that FIG. 1A illustrates just one example of a customer premises 116 environment and that the various embodiments discussed herein are not limited to use of such systems. Customer premises 116 can include a variety of communication systems and can use a variety of communication devices, presentation devices and media including, but not limited to, media provided by satellite, cable and Internet streaming services.

Home automation service providers, such as, but not limited to, home security service and data service providers, provide their customers a multitude of home automation and/or security services. Such services may include remote monitoring of various home automation devices over telecommunication channels, the Internet or other communication channels and may also include providing equipment and installation of equipment for the service provider and/or user to configure, manage and control such home automation devices. Examples of such home automation devices may include, but are not limited to, one or more of, or any combination of: a camera, a thermostat, a light fixture, a door sensor, a window sensor, a power outlet, a light switch, a doorbell, a doorbell sensor, a light bulb, a motion sensor, an electrical switch, an appliance switch, window covering control device, an alarm, a dimmer switch and a door lock. Such home automation devices are represented by device A 130 and device B 132. In various embodiments, there may be additional or fewer home automation devices than that shown in FIG. 1A.

Monitoring and control of such home automation devices, such as device A 130 and device B 132, may be provided by use of a home automation hub 118 communicatively coupled to a presentation device 120 configured to receive interactive user interface data and various other input from the home automation hub 118. Home automation hub 118 interconnects wirelessly to one or more home automation devices, represented by device A 130 and device B 132. In some embodiments, there may be a wired connection to a plurality of home automation devices. The home automation hub 118 receives various commands wirelessly from a remote-control device ("remote") 128. These commands control the home automation hub 118 which in turn configures, controls and manages device A 130 and device B 132. For example, the home automation hub may send a signal to turn off or turn down the lights, turn up or down the temperature setting on a thermostat, initiate a security camera to turn on or start recording, or perform various other home automation functions. Such home automation functions may be performed based on a set of conditions or rules implemented by the home automation hub 118.

An interface between the home automation hub 118 and a user may be provided by a hand-held remote-control device (i.e., "remote") 128. Remote-control device 128 typically communicates with the home automation hub 118 using a suitable wireless medium, such as infrared ("IR"), radio frequency ("RF"), or the like and may be any wireless handheld device, including a mobile device such as a cellular telephone or a tablet device. Other input or control devices (not shown) may also be communicatively coupled to the home automation hub 118. Non-limiting examples include game device controllers, keyboards, touch pads, touch screens, pointing devices and the like. The remote-control device 128 may also control other devices, such as the auxiliary device 122, presentation device 124 and/or other endpoint devices (not shown). The remote-control device 128 may be a "universal" remote or otherwise programmable or configurable by a manufacturer, user and/or other device to control such other devices.

Home automation hub 118 may also provide an interactive user interface to the home automation system that is controlled by the remote control device 128. This interactive user interface may be communicated to and displayed on the display 124 of presentation device 120 to enable the user to configure, control and manage device A 130 and device B 132 via home automation hub 118. In one example embodiment, the connection between the home automation hub 118 and the presentation device 120 is a wired connection, such as a wired High-Definition Multimedia Interface (HDMI) connection. However, in other embodiments, the connection between the home automation hub 118 and the presentation device 120 may be another type of wired connection or may be a wireless connection.

In some embodiments, the connection between the home automation hub 118 and the various home automation devices, such as device A 130 and device B 132 includes a wireless connection. This wireless connection may, for example, be a Zigbee® network connection based on the IEEE 802.15.4 specification, a Z-Wave® connection, a Wi-Fi connection based on the IEEE 802.11 specifications or a Bluetooth® connection, or another wireless connection based on protocols for communication among devices used for home automation, including those that use radio frequency (RF) for signaling and control. In some embodiments, different home automation devices may have different types of wireless connections to the home automation hub 118. Often, such wireless connections involve a network pairing between the home automation hub 118 and the various home automation devices, such as device A 130 and device B 132.

A wireless signal of sufficient quality is desirable in order to install wireless home automation devices on the customer premises 116 if they are to communicate wirelessly with and be configured, controlled and managed by the home automation hub 118. Therefore, before such home automation devices are installed, or during the process of installing such home automation devices, remote-control device 128 may detect whether such a wireless signal is able to be received at various locations on the customer premises 116 and indicate that on the remote-control device 128. In some embodiments, the remote-control performs its own pairing process with the home automation hub 118 before performing the wireless signal detection. The remote-control device 128 may be configured to not only detect whether such a wireless signal is able to be received from the home automation hub 118, but also determine the wireless signal quality, e.g., the strength of the signal, the consistency of the signal and other qualities of the signal. The remote-control device 128 may then determine whether the signal quality is such that if a home automation device were to be installed on the customer premises 116 at the current location of the remote-control device 128, the home automation hub would be able to communicate with and control the home automation device over the applicable wireless communication channel. This may be indicated by an indicator on the remote control device 128 that indicates whether the signal quality is sufficient. In some embodiments, a measurement of the wireless signal strength, strength and/or consistency is presented on the remote-control device 128.

The user may initiate such a signal test by pressing a corresponding button or switch on the remote-control device 128 or otherwise activating a corresponding control on the remote-control device 128. This will cause the remote-control device 128 to begin listening for an applicable wireless signal from the home automation hub 118. In other embodiments, the remote-control device is continuously performing such a detection of the wireless signal from the home automation hub 118. In some embodiments, the user may select which type of wireless signal for the remote control 118 to detect (e.g., a Zigbee® wireless network signal based on the IEEE 802.15.4 specification, a Z-Wave® wireless network signal, a Wi-Fi wireless network signal based on the IEEE 802.11 specifications or a Bluetooth® wireless network signal). In other embodiments, the remote-control device 128 has different indicators on the remote-control device corresponding to different types of wireless signals connections. The remote-control device 128 will then display an indication on the remote control 128 regarding the strength or quality of the applicable wireless signal. This may be an indication of signal strength, signal consistency, and/or whether the signal is sufficient for installation of a new home automation device at the current location of the remote control device 128.

The remote control device 128 may continue to display such an indication regarding the signal, or lack thereof, as the user moves about the customer premises 116 with the remote control 128. In this manner, the user may find which locations on the customer premises are suitable for installation of home automation devices to communicate wirelessly with the home automation hub 118. In some embodiments, the remote control device 128 may also or instead emit an audible indication or indications indicative of the wireless signal strength, signal consistency, and/or whether the signal is sufficient for installation of a new home automation device at the current location of the remote control device 128.

The home automation hub 118 may include, be part of, or be operably connected to devices such as a "television converter," "receiver," "set-top box," "television home automation hub," "television receiver," "television recording device," "satellite set-top box," "satellite receiver," "cable set-top box," "cable receiver," "media player," "Internet streaming device" and/or "television tuner." For example, the remote-control device 128 may receive user input to cause the home automation hub 118 to cause a menu for controlling home automation device A and home automation device B to be displayed on the display 124 along with a television program being displayed on the display 124. The home automation hub 118 may be any suitable device or electronic equipment that is operable to control, configure and/or manage home automation devices such as home automation device A and home automation device B. Further, the home automation hub 118 may itself include user interface devices, such as buttons, switches and displays. In many applications, the remote-control device 128 is operable to control the presentation device 120, a set-top box, and/or other auxiliary devices.

Examples of a presentation device 120 include, but are not limited to, a television ("TV"), a personal computer ("PC"), a sound system receiver, a digital video recorder ("DVR"), a compact disk ("CD") device, game system, or the like. Presentation devices 120 may employ a display 124, one or more speakers (not shown), and/or other output devices to communicate video and/or audio content to a user. In many implementations, one or more presentation devices 120 reside in or near a customer's premises 116 and are communicatively coupled, directly or indirectly, to the home automation hub 118. Further, the home automation hub 118 and the presentation device 120 may be integrated into a single device. Such a single device may have the functionality of the home automation hub 118 described herein and the presentation device 120, or may even have additional functionality.

Customer premises 116 may include other devices which are communicatively coupled to the home automation hub 118 and/or a communication system via a suitable media. For example, the customer premises 116 may include an optional network, communication system or networked system (not shown), to which home automation hub 118, presentation device 120, and/or a variety of auxiliary devices (collectively referred to herein as endpoint devices) are connected. Non-limiting examples of such a network or communication system include, but are not limited to, an Ethernet system, twisted pair Ethernet system, an intranet, a local area network ("LAN") system, short range wireless network (e.g., Bluetooth®), a personal area network (e.g., a Zigbee network based on the IEEE 802.15.4 specification), a Z-Wave® network, a Consumer Electronics Control (CEC) communication system or the like. One or more endpoint devices, such as PCs, data storage devices, TVs, game systems, sound system receivers, Internet connection devices, digital subscriber loop ("DSL") devices, wireless LAN, Wi-Fi, Worldwide Interoperability for Microwave Access ("WiMax") devices, or the like, may be communicatively coupled to the network or to each other so that the plurality of endpoint devices are communicatively coupled together. Thus, such a network allows the interconnected endpoint devices, and the home automation hub 118, to communicate with each other. Alternatively, or in addition, some devices in the customer premises 116 may be directly connected to the network, such as a telephone which may employ a hardwire connection or an RF signal for coupling to the network, which may also connect to other networks or communications systems outside customer premises 116.

In some embodiments, the remote-control device 128 may be a multibrand remote that comes to the user preprogrammed with the codes to operate a number of standard home electronic devices. Such a remote may be able to control multiple devices and, in some embodiments, control their main functions, such as channel turning, volume control and other functions. The remote-control device 128 may also be a "learning" remote. In particular, while the remote-control device 128 may be preprogrammed to operate a number of popular electronic models, it may also have the ability to learn the functions of the original manufacturer's remote of each device. For example, this may be accomplished by placing the remote-control device 128 head-to-head with the device's original manufacturer's remote and infrared signals will be transmitted to the learning remote that allow it to duplicate the other remote's commands. Such learning can also be accomplished via RF or wired communication between remote-control devices and/or other devices. Also, in order to have the remote-control device 128 send the correct command to the device the user currently wants to control, in some embodiments, remote-control device 128 may have a plurality of different modes in which a set of controls on the remote-control device 128 are used to control a particular device when in a mode corresponding to that device.

The above description of the customer premises 116, and the various devices therein, is intended as a broad, non-limiting overview of an example environment in which various embodiments of a remote-control device 128 may be implemented. The customer premises 116 and the various devices therein, may contain other devices, systems and/or media not specifically described herein.

Example embodiments described herein provide applications, tools, data structures and other support to implement systems and methods for finding wireless signals sufficient for installation of home automation devices. Other embodiments of the described techniques may be used for other purposes, including for wireless network signal detection generally. In the following description, numerous specific details are set forth, such as data formats, code sequences, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the techniques and/or functions described are not limited by the particular order, selection, or decomposition of steps described with reference to any particular module, component, or routine.

Figure 1B:
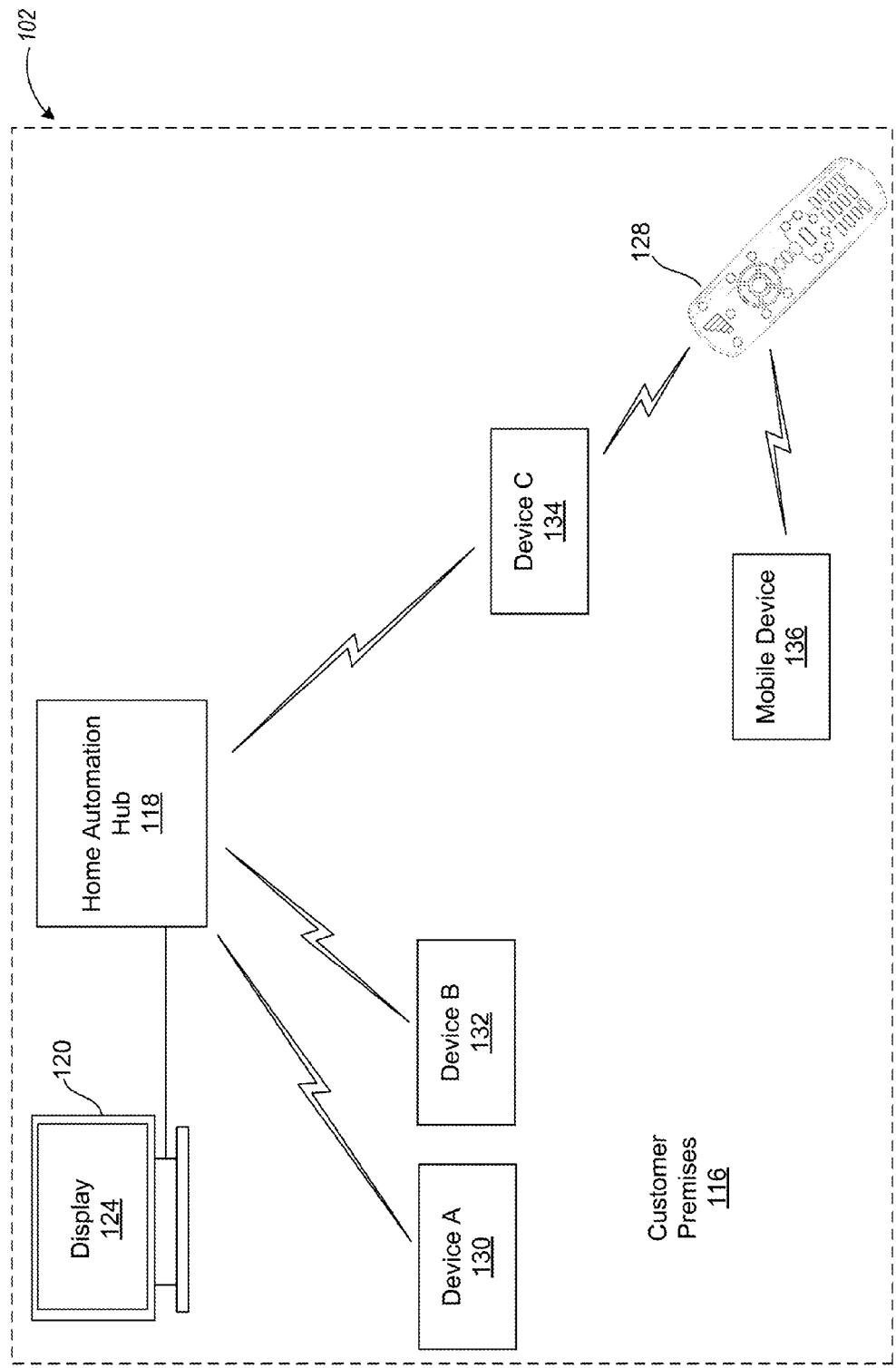
FIG. 1B is a block diagram illustrating another example environment in which various embodiments of systems and methods for finding wireless signals sufficient for installation of home automation devices may be implemented.

FIG. 1B is a block diagram illustrating another example environment 102 in which various embodiments of systems and methods for finding wireless signals sufficient for installation of home automation devices may be implemented. In some embodiments, before home automation devices are installed in the home automation system on customer premises 116, or during the process of installing such home automation devices, remote-control device 128 may detect whether a suitable wireless signal is able to be received at various locations on the customer premises 116 and indicate that on the remote-control device 128. In some embodiments, the remote-control device 128 may first search for a signal from the home automation hub 118 and if remote-control device 128 does not find a wireless suitable signal from the home automation hub 118, the remote-control device 128 may search for a suitable signal from a repeater device, represented by device C 134 in FIG. 1B that is connected to the home automation hub 118. A repeater device may be any device that repeats, relays and/or amplifies the wireless signal from the home automation hub 118, for example, to effectively extend the wireless signal range of the home automation hub 118.

In some embodiments, the repeater device may be another home automation device in operable communication with the home automation hub 118, such as, for example, an appliance switch that plugs into a power outlet power outlet and also uses power from the power outlet into which it is plugged to repeat, relay and/or amplify the wireless signal from the home automation hub 118. There may also be additional repeater devices either connected directly to the home automation hub 118 or connected to each other in a chain of repeater devices (not shown) back to the home automation hub 118. For example, device A and/or device B may be other repeater devices connected wirelessly directly to the home automation hub 118. The remote-control device 128 may then detect and/or select a wireless signal from the repeater device of the plurality of repeater devices on customer premises 116 that has the highest quality or otherwise most suitable signal for which to provide an indication on the remote-control device 128 regarding the signal quality, strength or suitability for communication back to the home automation hub 118. If the signal of the selected repeater device, for example device C 134, is sufficient as indicated on the remote-control device 128, it will then be device C 134 that will be wirelessly connected to (i.e., act as the "parent" device" for) the home automation device to be installed at the current location of the remote-control device 128 such that the installed home automation device can communicate with the home automation hub 118 via device C 134.

The remote-control device 128 may be configured to not only detect whether such a wireless signal is able to be received from device C 134, but also determine the wireless signal quality, e.g., the strength of the signal, the consistency of the signal and other qualities of the signal. The remote-control device 128 may then determine whether the signal quality from device C 134 is such that if a home automation device were to be installed on the customer premises 116 at the current location of the remote-control device 128, the home automation hub would be able to communicate with and control the home automation device over the applicable wireless communication channel via device C 134. This may be indicated by an indicator on the remote control device 128 that indicates whether the signal quality is sufficient. In some embodiments, a measurement of the wireless signal strength and/or consistency of the wireless signal from device C 134 is presented on the remote-control device 128.

In some instances the remote-control device 128 may detect wireless signals from both the home automation hub 118 and a repeater device, such as device C, in which case the remote-control device 128 may select the stronger or higher quality signal for which to provide an indication on the remote-control device 128 regarding the signal quality, strength or suitability for communication with the home automation hub 118. The remote-control device 128 and/or home automation hub 118 may also provide a user selectable option to have the remote-control device 128 detect a wireless signal from only the home automation hub 118 or from only a repeater device, such as device C 134.

Also, shown in FIG. 1B is a user mobile device 136. The user mobile device may be, for example, any wireless handheld device, including a mobile device such as a cellular telephone, smartphone or a tablet device. Non-limiting examples of such mobile devices include an Apple® iPhone® or tablet device and an Android® smartphone or tablet device. The remote-control device 128 may wirelessly pair with a mobile device of a user, such as mobile device 136. For example, this pairing may be via a Bluetooth® connection or other wireless connection. While paired to the mobile device 136, the remote-control device 128 may cause the mobile device 136 to graphically display an indication, based on the wireless signal quality between the remote-control device 128 and the home automation hub 118, whether the current location of the remote-control device is within sufficient wireless signal range of the home automation hub 118 and/or the repeater device, such as device 134. For example, this may be performed via communication with an application running on the mobile device configured to communicate wirelessly with the remote-control device 128 and to provide applicable graphical output to a display of the mobile device 136. The sufficient wireless signal range is such that if a home automation device were to be installed at the current location of the remote-control device 128 in the customer premises, the home automation hub 118 would be able to communicate with and control the home automation device over a wireless communication channel.

The wireless communication channel may be a direct wireless connection between the home automation device and the home automation hub 118 or may in some embodiments include a wireless connection via a repeater device, such as device C 134. In some embodiments, the remote-control device 128 may detect the wireless signal quality between the remote control device 128 and the home automation hub 118 and/or between the remote control device 128 and/or a repeater device, such as device C 134. The remote-control device 128 may then send a signal to the mobile device 126 to cause the mobile device 136 to graphically display an indication of different levels of wireless signal quality between the remote-control device 128 and the home automation hub 118 and/or device C 134 based on a detected wireless signal quality between the remote control device 128 and the home automation hub 118 and/or device C 134.

Figure 2:
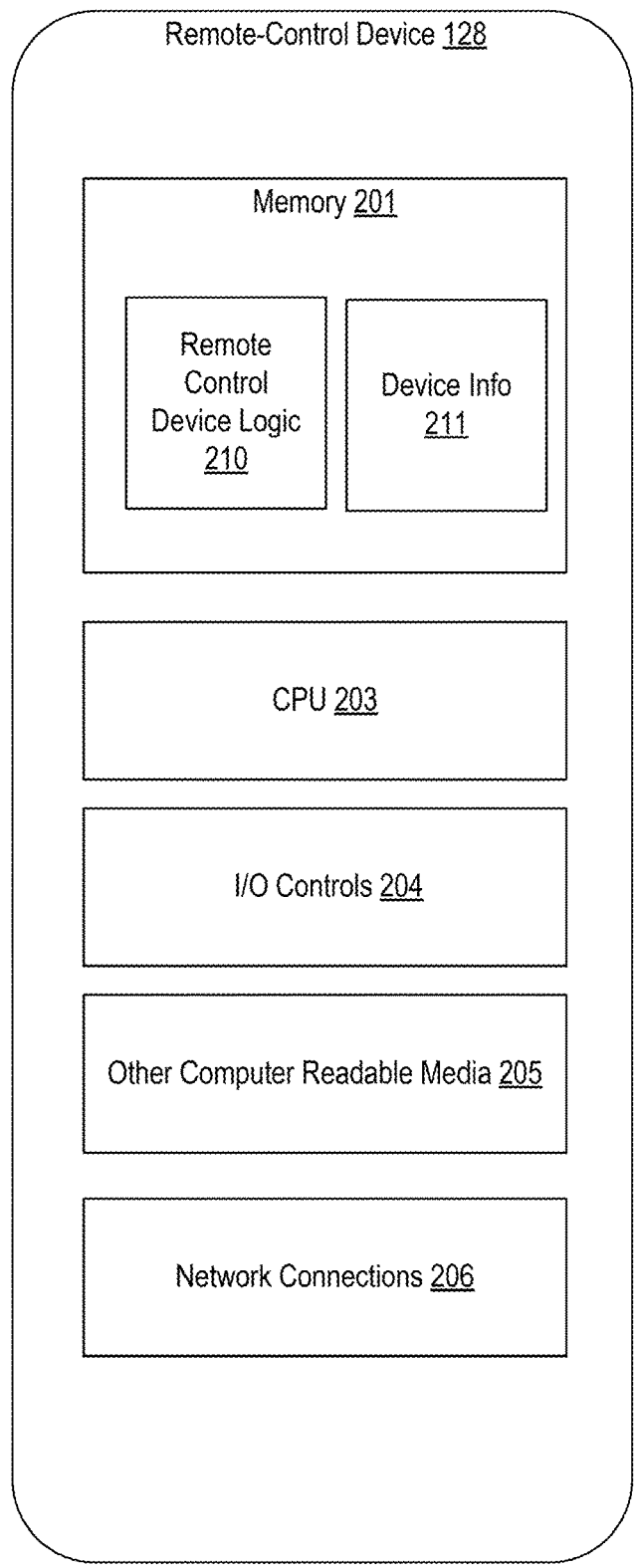
FIG. 2 is a block diagram illustrating components of an example embodiment of a remote-control device for finding wireless signals sufficient for installation of home automation devices.

FIG. 2 is a block diagram illustrating components of an example embodiment of a remote-control device 128 for finding wireless signals sufficient for installation of home automation devices. In one embodiment, remote-control device 128 comprises a computer memory ("memory") 201 and one or more Central Processing Units ("CPU") 203. Also included are Input/Output "I/O" controls 204, including, but not limited to: buttons, virtual buttons, switches, keypads, keyboards, touchpads, touchscreens, display screens, liquid crystal displays, speakers, scroll wheel inputs, optical sensors, gesture sensors, accelerometers, motion control sensors, voice command sensors, microphones, track ball's and/or joysticks, etc. The remote-control device 128 may also include other computer-readable media 205 (e.g., flash memory, SIM card) and network connections 206. For example, the I/O controls 204 may include buttons such as those shown in FIGS. 3A and 3B, although different numbers and configurations of controls exist in various embodiments, including those with touch screen buttons and other input controls. The network connections 206 include one or more communication interfaces to various media devices, including but not limited to, radio frequency transceivers, infrared transceivers, Zigbee® network connection interfaces based on the IEEE 802.15.4 specification, Z-Wave® connection interfaces, wireless Ethernet ("Wi-Fi") interfaces, short range wireless (e.g., Bluetooth®) interfaces and the like. The one or more Central Processing Units ("CPU") 203 may be communicatively coupled to the memory 201 and the Input/Output controls 204, other computer-readable media 205 and network connections 206, (e.g., via a communications bus) in a manner to control one or more operations of those various components.

The remote-control device 128 may communicate with home automation hub 118, and possibly other devices such as device A 130, device B 132, device C 134, mobile device 136, presentation device 120 shown in FIG. 1B and a set-top box, Internet gateway or other media devices (not shown). Example media devices include other remote-control devices, media players, streaming media devices, DVRs, DVD players, video recorders, audio systems, displays, personal computers and the like. Other types of home automation devices which remote may communicate with include, but are not limited to control systems for home electromechanical systems, such as a lighting system, security system, video camera system, climate control system, spa/pool, and the like.

Remote-control device logic 210 and device information 211 is shown residing in memory 201. In other embodiments, some portion of the device information and some of, or all of, the components of the logic 210 may be stored on the other computer-readable media 205. The logic 210 preferably executes on one or more CPUs 203 and manages operation of the remote-control device 128, as described herein. The logic 210 may comprise or implement a system control module as executed by one or more CPUs 203 that are communicatively coupled to the I/O controls 204 and other components of the remote-control device 128. Other code or programs and potentially other data/information (not shown), may also reside in the memory 201, and may execute on one or more CPUs 203. Of note, one or more of the components in FIG. 2 may not be present in any specific implementation. For example, some embodiments may not provide other computer readable media 205.

The logic 210 performs the core functions of the remote-control device 128, as discussed herein and also with respect to FIGS. 1A through 6. In particular, the logic 210 reads input that results from activation of I/O controls 204 on the remote-control device 128 by the user and performs the function corresponding to the input, including sending commands to various devices and performing internal operations of the remote-control device 128.

The logic 210, when executed on one or more CPUs 203, may not only detect whether such a wireless signal is able to be received from home automation hub 118 and/or a repeater device, but also determine the wireless signal quality, e.g., the strength of the signal, the consistency of the signal and other qualities of the signal. For example, the logic 210, when executed on one or more CPUs 203, may measure and analyze the strength, consistency and other qualities of a ZigBee® RF signal using parameters such as Received Signal Strength (RSSI), Link Quality Indication (LQI) and Packet Error Rate (PER) associated with the received ZigBee® RF signal. Wireless signal strength may be measured in either percentile or dBm (the power ratio in decibels of the measured power referenced to one milliwatt). In some embodiments, the signal strength may be measured based on the RSSI value (measured in −dBm) of the last received packet. In some embodiments, the logic 210, when executed on one or more CPUs 203, may cause the remote-control device 128 to detect the wireless signal quality between the remote control device 128 and the home automation hub device 118 and then compare the detected wireless signal quality between the remote control device and the home automation hub 118 to a wireless signal quality threshold. The logic 210 will then cause an indicator on the remote-control device 128 to indicate whether the current location of the remote-control device 128 is within sufficient wireless signal range of the home automation hub 118 such that if a home automation device were to be installed at the current location of the remote-control device 128, the home automation hub 118 would be able to communicate with and control the home automation device over the wireless communication channel. This determination may be based on the comparison of the detected wireless signal quality between the remote-control device 128 and the home automation hub 118 to the wireless signal quality threshold.

For example, the threshold may be a signal strength value measured in dBm or percentile. In one embodiment, the threshold may be a signal level of −35 dBm and higher for the signal to qualify as suitable. However, any level suitable to enable the home automation hub 118 to communicate with and control the home automation device over the wireless communication channel may be used in various embodiments. In other embodiments individual or a combination of values associated with one or more parameters such as Received Signal Strength (RSSI), Link Quality Indication (LQI) and Packet Error Rate (PER) or the like may be used in the comparison or other analysis to determine whether a detected signal is of sufficient strength or quality. In some embodiments, the logic 210, when executed on one or more CPUs 203, may cause the remote-control device 128 to perform further decoding and/or processing of a detected wireless signal to determine other signal attributes or qualities to display or on which to base a signal quality determination.

Thus, the logic 210, when executed on one or more CPUs 203, may then cause the remote-control device 128 to determine whether the signal quality from home automation hub 118 or a repeater device, such as device C 134, is such that if a home automation device were to be installed on the customer premises 116 at the current location of the remote-control device 128, the home automation hub would be able to communicate with and control the home automation device over the applicable wireless communication channel. This may be indicated by an indicator on the remote control device 128 that indicates whether the signal quality is sufficient. Such an indicator is part of the I/O controls 204 communicatively coupled to the one or more CPUs 203. In some embodiments, a measurement of the wireless signal strength and/or consistency of the wireless signal from device C 134 is presented on the remote-control device 128 via the I/O controls 204.

In some instances the logic 210 may cause the one or more CPUs 203 of the remote-control device 128 to detect wireless signals from both the home automation hub 118 and a repeater device, such as device C, in which case the logic 210 may cause the remote-control device 128 to select the stronger or higher quality signal for which to provide an indication on the remote-control device 128 regarding the signal quality, strength or suitability for communication with the home automation hub 118. The remote-control device 128 and/or home automation hub 118 may also provide a user selectable option via the I/O controls 204 to have the remote-control device 128 detect a wireless signal from only the home automation hub 118 or from only a repeater device, such as device C 134. In some instances the logic 210 may cause the one or more CPUs 203 of the remote-control device 128 to find the strongest, most consistent, most reliable or otherwise "optimal" rather than sufficient signal available from the home automation hub 118 and/or repeater, such as device C 134. For instance, before the initial installation, in some embodiments, the logic 210 may cause the one or more CPUs 203 of the remote-control device 128 to perform a scan and choose the best combination of wireless channels (e.g., WiFi/ZigBee channels) over which to communicate.

Before an initial installation, an installer may want to walk the customer premises 116 to collect data points and tag or otherwise geo-locate a particular location. Such data points or tags may be stored by the memory 201 of the remote control device 128, memory of a mobile device, or other storage device in the system. The logic 210 may cause the one or more CPUs 203 of the remote-control device 128 or of a mobile device to present a display on the remote control device 128 or mobile device recommending the location of a repeater device, such as for device C 134. The logic 210 and the one or more CPUs on which the logic is executed may comprise a geo-location device that may reside on the remote control 128 or the installer's mobile device, such as the installer's tablet device or phone.

Furthermore, in some embodiments, rather than just monitoring signals from a repeater, such as device C 134, the logic 210 may cause the one or more CPUs 203 of the remote-control device 128 to temporarily emulate a repeater, such as by matching functionality of the repeater device, such as device C 134, to provide greater confidence in finding a suitable location for a permanent repeater. In particular, if the remote-control device 128 emulating a repeater in such a manner is successful in repeating the signal at a particular location, then that location may be especially suitable for a permanent repeater.

Also, in some embodiments, during initial installation of the system, the logic 210 may cause the one or more CPUs 203 of the remote-control device 128 to emulate a coordinator or a hub, such as home automation hub 118. Sensitive information such as keys could be passed using near-filed communication (NFC) or via scanning a bar code. This information and control could be passed to the hub via a wired interface, encrypted channels or other secure means.

Also, the logic 210 may gather information about various devices, such home automation hub 118 and possibly other devices such as device A 130, device B 132, device C 134, mobile device 136 and/or the presentation device 120 shown in FIG. 1B and a set-top box, Internet gateway or other media devices (not shown) and store that information as device information 211. In some embodiments, storing such information may be in order for the logic 210 to know which wireless signal to listen or search for when paired with that particular device. For example, the device information 211 may include, but is not limited to, a database of identifiers of various devices, device codes, wireless protocols used by various devices, identifiers of various corresponding modes, device commands, programmed macros, learned device commands, other remote control commands corresponding to those devices. The device information 211 may also store user preference data, user profile data, user credential or identity data and/or other user-related data. In this manner, various user profiles may be stored or otherwise accessed that prevent or allow pairing with, communication with or performing wireless signals tests with particular devices, based on a particular user identified as using the remote-control device 128 or being logged in a system that includes the remote-control device 128. In some embodiments, the user may be identified by password entry, fingerprint reader or other biometric data sensor or reader included in the I/O controls of the remote-control device 128.

In at least some embodiments, remote and/or programmatic access is provided to at least some of the functionality of the remote-control device 128. For example, the remote-control device 128 may provide to other devices an application program interface ("API") that provides access to various functions of the remote-control device 128, including access to information stored by the remote-control device 128 (e.g., about other media devices) and wireless signal test data and results. In this manner, the API may facilitate the development of third-party software, such as user interfaces, plug-ins, adapters and the like, such as for integrating functions of the remote-control device 128 into various user interface applications on media devices and various desktop or mobile device applications. For example, a particular mobile device application may present a graphically display showing an indication of different levels of wireless signal quality between the remote-control device 128 and the home automation hub 118 and/or device C 134 based on a detected wireless signal quality between the remote control device 128 and the home automation hub 118 and/or device C 134. In some embodiments, a particular mobile device application may present a customized or different user interface based upon the functionality and capabilities of the remote-control device 128 and/or other devices in the home automation system.

In an example embodiment, the logic 210 is implemented using standard programming techniques. For example, the logic 210 may be implemented as a "native" executable running on the CPU 203, along with one or more static or dynamic libraries. In other embodiments, the logic 210 may be implemented as instructions processed by a virtual machine that executes as some other program. In general, a range of programming languages known in the art may be employed for implementing such example embodiments, including representative implementations of various programming language paradigms and platforms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, PHP, Python, JavaScript, VBScript, and the like) and declarative (e.g., SQL, Prolog, and the like).

The embodiments described above may also use well-known or synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the functions of the remote-control device 128.

In addition, programming interfaces to the data stored as part of the device information 211, can be available by standard mechanisms such as through C, C++, C#, and Java APIs; libraries for accessing files, databases, or other data repositories; through scripting languages such as JavaScript and VBScript; or through Web servers, FTP servers, or other types of servers providing access to stored data. The device information 211 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of the remote-control device 128.

Furthermore, in some embodiments, some or all of the components/portions of the logic 210 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Such computer program products may also take other forms in other embodiments. Accordingly, embodiments of this disclosure may be practiced with other computer system configurations.

Figure 3A:
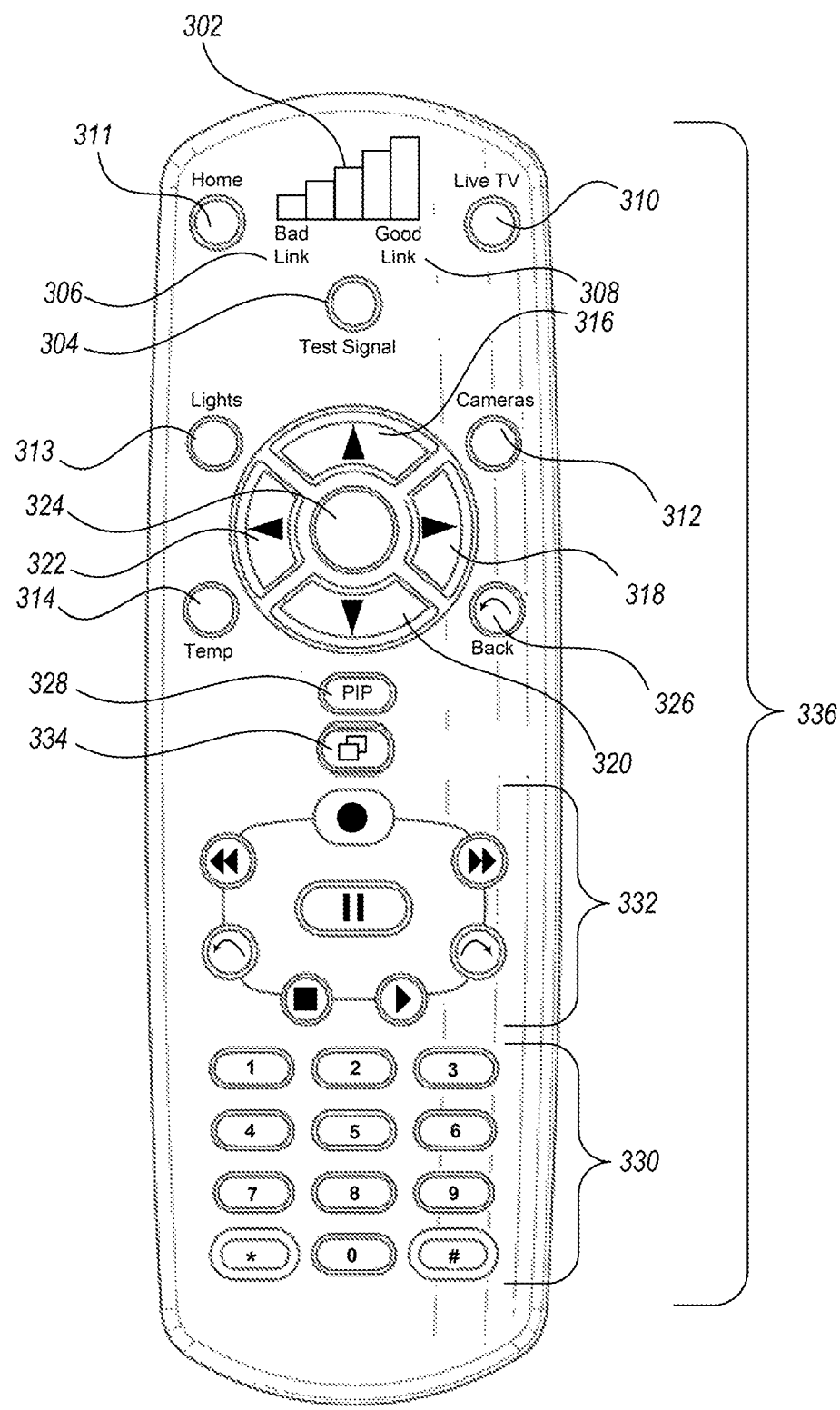
FIG. 3A is a diagram illustrating top plan view of an example embodiment of a remote-control device for finding wireless signals sufficient for installation of home automation devices.

FIG. 3A is a diagram illustrating top plan view of an example embodiment of a remote-control device 128 for finding wireless signals sufficient for installation of home automation devices. Shown is the remote-control device 128 according to one example embodiment. However, different buttons, different button configurations and various different types of input controls, including, but not limited to, those described herein with respect to I/O controls 204 with reference to FIG. 2, may be present in various other embodiments.

Included on the example remote-control device 128 shown in FIG. 3A is an example group of controls 336. The group of controls 336 include a various buttons for controlling aspects of a home automation and entertainment systems including a home button 311, a Live TV button 310, a cameras button 312, a lights button 313, and a temperature button 314. Such buttons, for example when activated send a command to the home automation hub 118 to cause the presentation device 120 display an applicable graphical user interface menu on the display 124 corresponding to that button. Buttons to navigate such menus are also shown including an up directional key 316, a down directional key 320, a left directional key 322, a right directional key 318, a select button 324 and a back button 326 to go back to the previous menu or selection.

Also shown is a test signal button 304. In some embodiments, when a user is in the process of installing a new home automation device on the customer premises 116, the user may bring the remote-control device 128 to the desired location on the customer premises at which the home automation device is to be installed and press the test signal button 304 to receive an indication from the remote-control device 128 as to whether there exists suitable wireless signal from the home automation hub 118 or a repeater for the home automation device to link or otherwise communicate with the home automation hub 118 directly or via the repeater device. Shown is a signal status bar 302 that will show the strength or other quality of the signal. In some embodiments, the signal status bar 302 comprises a series of light emitting diodes (LEDs) that illuminate according to various levels of signal strength or quality. In other embodiments, the signal status bar 302 comprises a graphical display, such a liquid crystal display (LCD), touch screen, or other display device.

For example, the signal status bar 302 may indicate the detected signal strength or quality is sufficient by illuminating a light emitting diode (LED) associated with the status bar or other graphical indication above the "Good Link" label 308. The signal status bar 302 indicates the signal strength or quality is insufficient by illuminating an LED associated with the status bar or other graphical indication above the "Bad Link" label 308 without illuminating other LEDs or other graphical indications on the signal status bar 302. As the detected signal increases in strength and/or quality additional bars within status bar 302 in the direction from the "Bad Link" label 308 toward to the "Good Link" label 308 are illuminated by an associated LED or other graphical indication. In some embodiments, the "Bad Link" label 308 and "Good Link" label 308 may be omitted and the indication of signal strength or quality is provided by the graduated bar sizes on the signal status bar 302. In some embodiments, the user pressing the "signal test" button again stops the signal detection and resulting presentation of the signal strength or quality indication on the signal status bar 302.

Also shown is a picture-in-picture (PIP) button 328. Activation of the PIP button 328 may send a command to cause the home automation hub 118 to cause a menu for controlling home automation devices to be displayed on the display 124 along with a television program being displayed on the display 124. Activation of the menu toggle button 334 may toggle between the menu for controlling home automation devices and the television program being displayed in front. Also shown are a set of controls 332 for controlling video playback and a keypad 330 for entering numbers in various menus and navigating directly to desired television channels by entering the television channel number.

Additional, fewer, or different buttons or other controls may also be present in the group of controls 336 corresponding to other or different functionality of various devices. For example, some embodiments do not include the test signal command button 304 as the remote-control device 128 may be continuously testing for a sufficient signal in some embodiments. Other buttons or controls may control other media device settings, on-demand services, purchase requests, and general menu and graphical user interface (GUI) navigation. The dimensions and overall shape of the remote-control device 128 may vary depending on the positioning and placement of the group of controls 336, the positioning of the particular internal electronics of the remote-control device 128 components shown in FIG. 2, and any modifications for ease and comfort of use of the remote-control device 128.

Other menus, interfaces and applications may be displayed and controlled using the remote-control device 128 directional keys 322, 324, 326, 328 to control movement of the cursor or other menu navigation and/or using the keypad 330 and/or QWERTY keyboard (not shown) on the back of the remote-control device 128 to enter text or other input into the various menus, interfaces and applications in communication with the presentation device 120 and/or the home automation hub 118. Examples of such other menus, interfaces and applications include, but are not limited to, menus, interfaces and applications of: televisions, satellite and cable receivers, DVD players, game consoles, computers, mobile devices, tablets and computer networks. Other such examples include digital video or audio recorders or players, analog video or audio recorders or players, stereo equipment, home appliances, mobile devices, MP3 players, cellular phones, home entertainment systems, home theater systems, smart home systems, home electromechanical systems, such as a lighting system, security system, climate control system, spa/pool, and the like, or other media devices, etc.

Figure 3B:
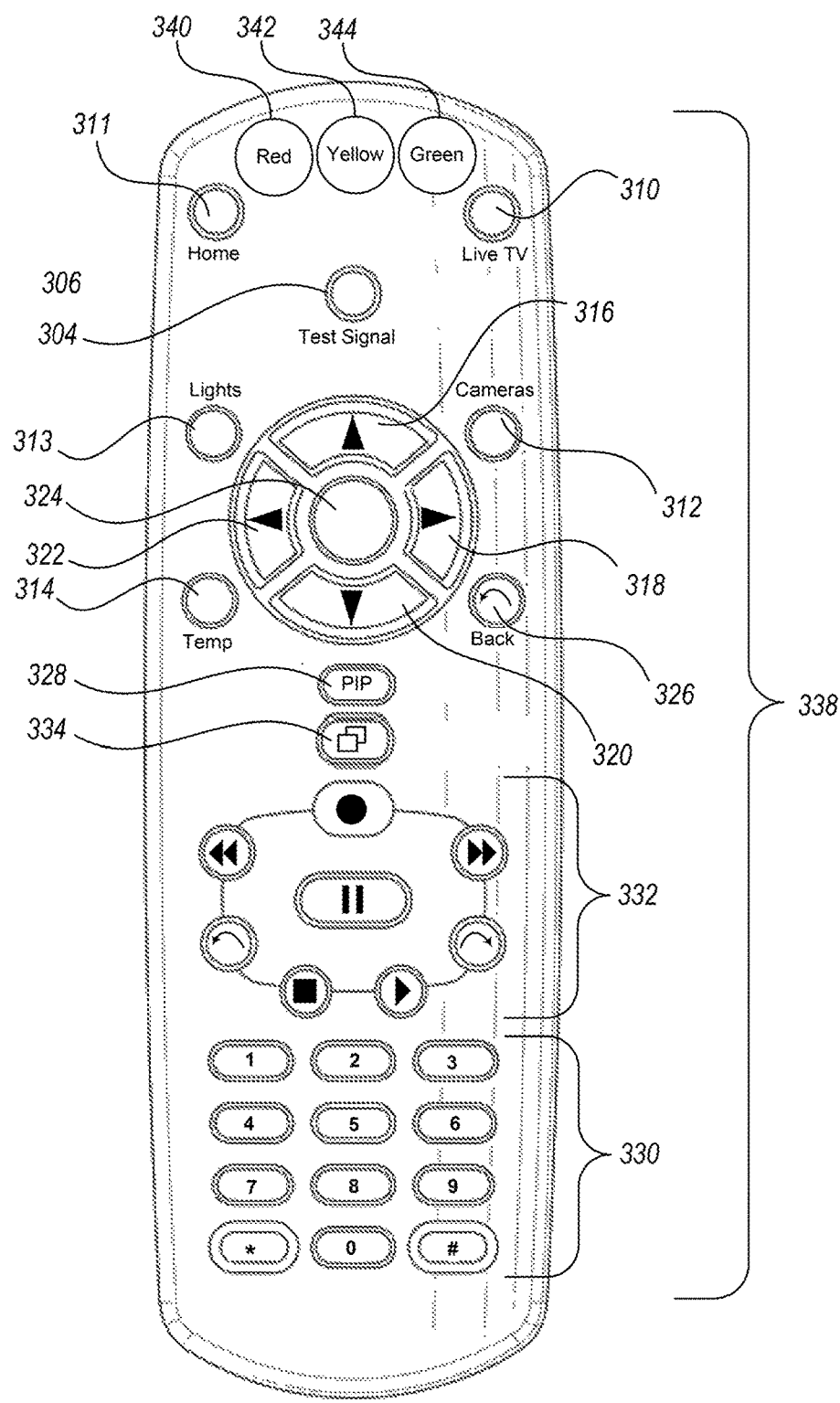
FIG. 3B is a diagram illustrating top plan view of another example embodiment of a remote-control device for finding wireless signals sufficient for installation of home automation devices.

FIG. 3B is a diagram illustrating top plan view of another example embodiment of a remote-control device for finding wireless signals sufficient for installation of home automation devices. The embodiment of remote-control device 128 shown in FIG. 3B is similar to that shown in FIG. 3A except that instead of the signal status bar 302 shown in FIG. 3A, shown in FIG. 3B is a color-coded signal status indicator including a green signal status indicator 344, a yellow signal status indicator 342 and a red signal status indicator 340. When the remote-control device 128 determines that the wireless signal strength or quality received from the home automation hub 118 or repeater device is sufficient, the green signal status indicator 344 will be illuminated. When the remote determines that the wireless signal strength or quality received from the home automation hub 118 or repeater device is not sufficient, red signal status indicator 340 will be illuminated. When the remote determines that it is inconclusive whether the wireless signal strength or quality received from the home automation hub 118 or repeater device is sufficient, the yellow signal status indicator 342 will be illuminated. Other colors or signals may be used in various different embodiments to indicate sufficient, insufficient or inconclusive signal quality or strength. In some embodiments, there may be fewer or more indicators present. For example, in one embodiment, there are only two indicators regarding signal quality or strength. In that case, one indicator illuminates to indicate sufficient wireless signal quality or strength is being detected and the other indicator illuminates to indicate sufficient wireless signal quality or strength is not being detected. The green signal status indicator 344, yellow signal status indicator 342 and red signal status indicator 340 may be comprised of LEDs or graphical indications on a display, such as on an LCD or touch screen or other display.

Figure 4:
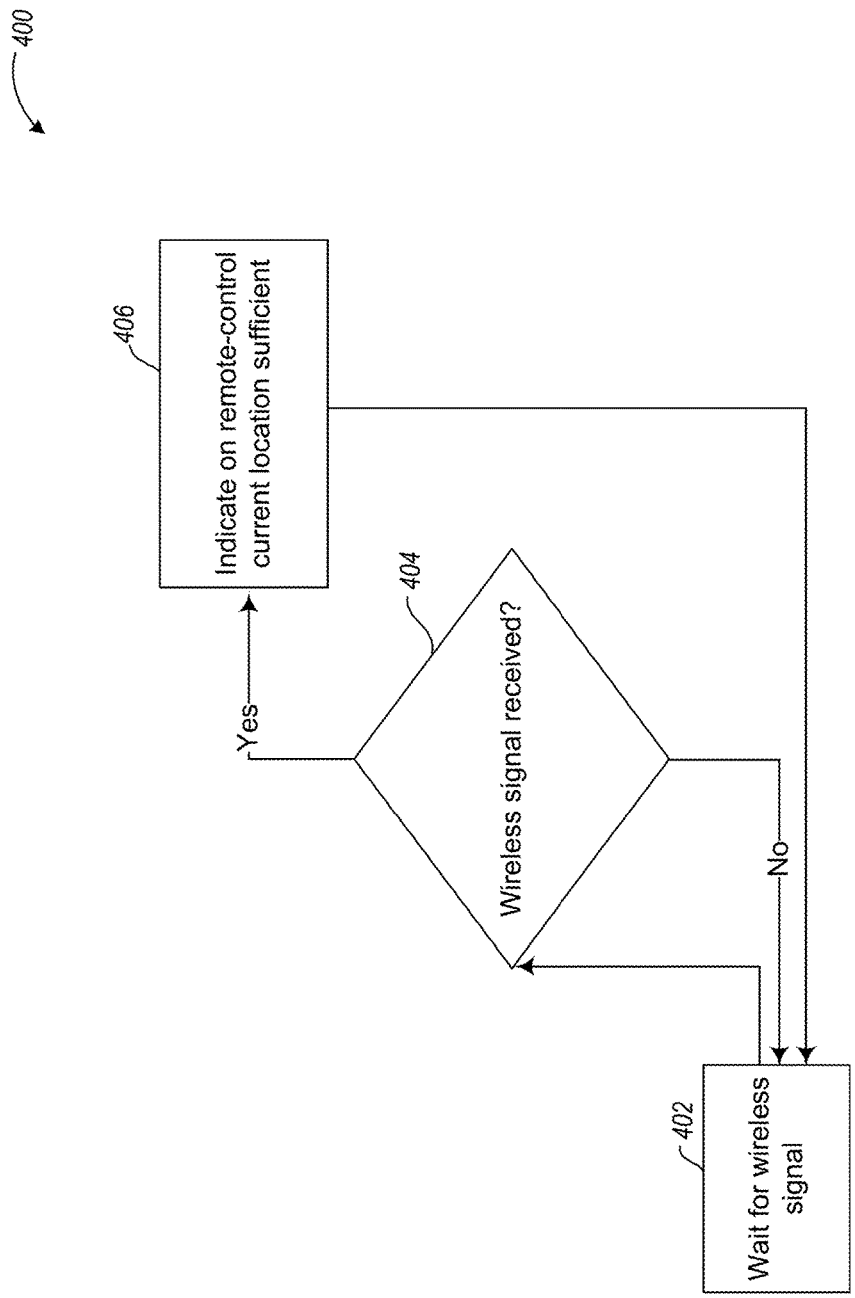
FIG. 4 is a flow diagram of a process for finding wireless signals sufficient for installation of home automation devices provided by a first example embodiment.

FIG. 4 is a flow diagram of a process 400 for finding wireless signals sufficient for installation of home automation devices provided by a first example embodiment.

At 402 the remote-control device 128 waits for a wireless signal. This may be performed by listening or searching for a wireless signal from a home automation hub and/or a wireless signal repeater within a home automation system.

At 404 the remote-control device 128 detects whether a wireless signal is able to be received by the remote-control device from a home automation hub device over a wireless communication channel at a current location of the remote-control device 128.

At 406, if the wireless signal is detected, the remote-control device 128 causes the indicator on the remote-control device 128 to indicate, based on the wireless signal quality between the remote-control device and the home automation hub device, whether a current location of the remote-control device is within sufficient wireless signal range of the home automation hub such that if a home automation device were to be installed at the current location of the remote-control device, the home automation hub would be able to communicate with and control the home automation device over the wireless communication channel.

If the wireless signal is not detected, the remote-control device 128 continues to wait for the wireless signal.

At 402, the process waits for an input signal on the remote-control device 128.

Figure 5:
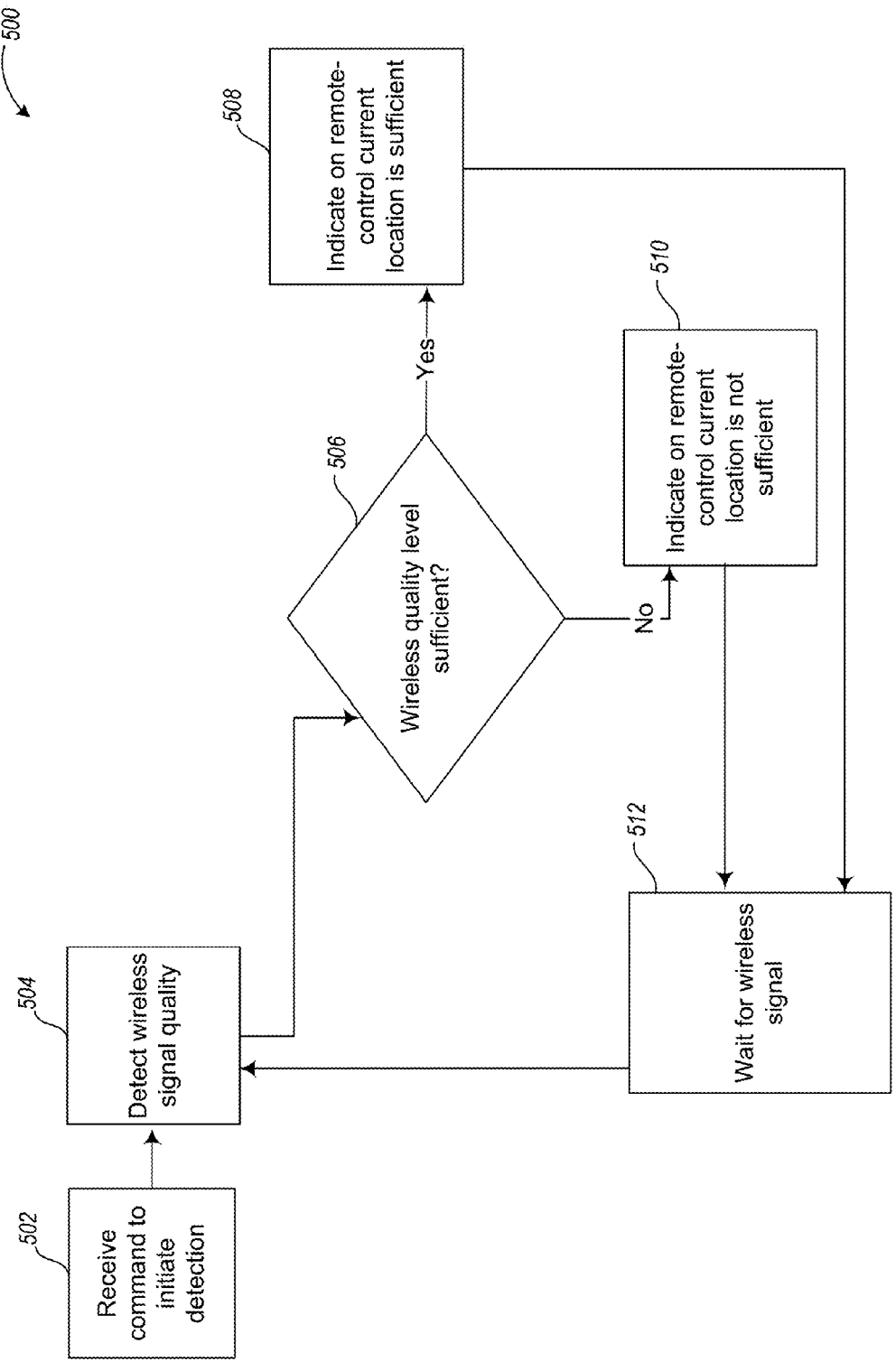
FIG. 5 is a flow diagram of a process for finding wireless signals sufficient for installation of home automation devices provided by a second example embodiment.

FIG. 5 is a flow diagram of a process 500 for finding wireless signals sufficient for installation of home automation devices provided by a second example embodiment.

At 502, the remote-control device 128 receives input including a command to initiate detection of a wireless signal quality between the remote-control device and a home automation hub device.

At 504, the remote-control device 128 in response to receiving the command, detects wireless signal quality between the remote-control device and the home automation hub device over a wireless signal channel.

At 506, the remote-control device 128 determines whether the wireless signal quality is sufficient for the home automation hub to be able to communicate with and control, over the wireless signal channel, a home automation device to be located at the current location of the remote control device based on the detected wireless signal quality.

At 508, if the wireless signal quality is determined to be sufficient, the remote-control device 128 indicates on the remote-control device that the detected wireless signal quality is sufficient for the home automation hub to be able to communicate with and control, over the wireless signal channel, a home automation device to be located at the current location of the remote control device based on the detected wireless signal quality.

At 510, if the wireless signal quality is determined not to be sufficient, the remote-control device 128 indicates on the remote-control device that the detected wireless signal quality is not sufficient for the home automation hub to be able to communicate with and control, over the wireless signal channel, a home automation device to be located at the current location of the remote control device based on the detected wireless signal quality.

At 512, the remote-control device 128 waits for a wireless signal from the home automation hub.

FIG. 6 is a flow diagram of a process 600 for finding wireless signals sufficient for installation of home automation devices provided by a third example embodiment.

At 602, the remote-control device 128 waits for a wireless signal from the home automation system.

At 604, the remote-control device 128, determines whether a wireless signal is able to be received by the remote-control device 128 directly from a home automation hub device within the home automation system.

At 606, if a wireless signal is able to be received by the remote-control device 128, then the remote-control device 128 determines a signal quality of the wireless signal received by the remote-control device 128.

At 608, the remote-control device 128 indicates, on the remote-control device 128, the signal quality of the wireless signal received by the remote-control device 128.

At 610 if a wireless signal is not able to be received by the remote-control device 128 directly from the home automation hub device at the current location of the remote-control device 128, then the remote-control device 128 searches for a wireless signal from a repeater device that is connected (directly or indirectly) to the home automation hub and through which a signal is able to be received by the remote-control device 128 from the home automation hub device.

At 612, the remote-control device 128, determines whether a wireless signal is able to be received by the remote-control device 128 from a repeater device that is connected (directly or indirectly) to the home automation hub. If a wireless signal is able to be received by the remote-control device 128 from such a repeater device, then the process proceeds to 606. If a wireless signal is not able to be received by the remote-control device 128 from such a repeater device, then the process proceeds to 602.

From the foregoing it will be appreciated that, although specific embodiments of the invention have been described herein for purposes of illustration, various modifications may be made without deviating from the scope of the invention. Accordingly, the invention is not limited except as by the appended claims.

The invention claimed is:

1. A remote-control device comprising:
a remote-control device housing;
a system control module within the housing;
a set of input controls positioned on the housing communicatively coupled to the system control module; and
an indicator on the remote-control device housing communicatively coupled to the system control module, the indicator operable to indicate a wireless signal quality between the remote control device and a home automation hub device, and wherein the system control module is configured to:
detect whether a wireless signal is able to be received by the remote-control device from a home automation hub device over a wireless communication channel at a current location of the remote-control device, wherein the remote-control device is a remote-control device of the home automation hub device;
cause the indicator to indicate, based on the wireless signal quality between the remote-control device and the home automation hub device, whether a current location of the remote-control device is within sufficient wireless signal range of the home automation hub such that if a home automation device were to be installed at the current location of the remote-control device, the home automation hub would be able to communicate with and control the home automation device over the wireless communication channel;
receive user input at the remote control device to cause the home automation hub device to cause a menu for controlling home automation devices to be displayed on a television along with a television program being displayed on the television; and
send a remote control command to the home automation hub device to cause the home automation hub device to cause a menu for controlling home automation devices to be displayed on the television along with the television program being displayed on the television.

2. The remote-control device of claim 1 wherein the system control module is further configured to:
if a wireless signal is not able to be received by the remote-control device directly from the home automation hub device over the wireless communication channel, then search for a wireless signal from a repeater device that is connected to the home automation hub and through which a signal is able to be received by the remote-control device from the home automation hub device over the wireless communication channel; and
based on the search, if the wireless signal is found from the repeater device that is connected to the home automation hub and through which a signal is able to be received by the remote-control device from the home automation hub device over the wireless communication channel, then cause the indicator to indicate, based on a wireless signal quality between the remote-control device and the repeater device, whether a current location of the remote control device is within sufficient wireless signal range of the repeater device such that if a home automation device were to be installed at the current location of the remote-control device, the home automation hub would be able to communicate with and control the home automation device over the wireless communication channel through the repeater device.

3. The remote-control device of claim 2 wherein the repeater device is another home automation device that the home automation hub device is able to communicate with and control over the wireless communication channel.

4. The remote-control device of claim 1 wherein the system control module is further configured to:
detect the wireless signal quality between the remote control device and the home automation hub device;
compare the detected wireless signal quality between the remote control device and the home automation hub device to a wireless signal quality threshold; and
cause the indicator to indicate, based on the comparison of the detected wireless signal quality between the remote-control device and the home automation hub device to a wireless signal quality threshold, whether the current location of the remote-control device is within sufficient wireless signal range of the home automation hub such that if a home automation device were to be installed at the current location of the remote-control device, the home automation hub would be able to communicate with and control the home automation device over the wireless communication channel.

5. The remote-control device of claim 1 wherein the indicator is configured to provide indications of different levels of wireless signal quality between the remote-control device and the home automation hub device and the system control module is further configured to:
cause the indicator to indicate different levels of wireless signal quality between the remote-control device and the home automation hub device based on the detected wireless signal quality between the remote control device and the home automation hub device.

6. The remote-control device of claim 5 wherein the system control module is further configured to:
continuously detect the wireless signal quality between the remote control device and the home automation hub device and continuously cause the indicator to indicate updated levels of wireless signal quality between the remote-control device and the home automation hub device based on the continuous detection of the wireless signal quality between the remote control device and the home automation hub device.

7. The remote-control device of claim 6 wherein the continuously causing the indicator to indicate updated levels of wireless signal quality between the remote-control device and the home automation hub includes causing an audible indication to occur to indicate updated levels of wireless signal quality between the remote-control device and the home automation hub.

8. The remote-control device of claim 1 wherein the system control module is further configured to:
first perform a pairing process between the remote-control device and the home automation hub device before subsequently detecting whether a wireless signal is able to be received by the remote-control device from a home automation hub device over a wireless communication channel and before causing the indicator to indicate, based on the wireless signal quality between the remote-control device and the home automation hub device, whether the current location of the remote-control device is within sufficient wireless signal range of the home automation hub such that if a home automation device were to be installed at the current location of the remote-control device, the home automation hub would be able to communicate with and control the home automation device over the wireless communication channel.

9. The remote-control device of claim 1 wherein the system control module is further configured to:
detect whether a wireless signal is able to be received by the remote-control device from the home automation hub device over a wireless communication channel at another location of the remote-control device; and
cause the indicator to indicate, based on the wireless signal quality between the remote-control device and the home automation hub device, whether the other location of the remote-control device is within sufficient wireless signal range of the home automation hub such that if a home automation device were to be installed at the other location of the remote-control device, the home automation hub would be able to communicate with and control the home automation device over the wireless communication channel.

10. The remote-control device of claim 1 wherein the system control module is further configured to:
cause the remote-control device to wirelessly pair with a mobile device of a user; and
cause the mobile device of the user to graphically display an indication, based on the wireless signal quality between the remote-control device and the home automation hub device, whether the location of the remote-control device is within sufficient wireless signal range of the home automation hub such that if a home automation device were to be installed at the location of the remote-control device, the home automation hub would be able to communicate with and control the home automation device over the wireless communication channel.

11. The remote-control device of claim 10 wherein the system control module is further configured to:
detect the wireless signal quality between the remote control device and the home automation hub device; and
cause the mobile device of the user to graphically display an indication of different levels of wireless signal quality between the remote-control device and the home automation hub device based on a detected wireless signal quality between the remote control device and the home automation hub device.

12. The remote-control device of claim 1 wherein the indication of whether a current location of the remote-control device, based on the wireless signal quality between the remote-control device and the home automation hub device, is within sufficient wireless signal range of the home automation hub includes a green visual indication if the current location of the remote-control device is within the sufficient wireless signal range of the home automation hub and a red visual indication if the current location of the remote-control device is not within the sufficient wireless signal range of the home automation hub.

13. The remote-control device of claim 12 wherein the indication of whether a current location of the remote-control device, based on the wireless signal quality between the remote-control device and the home automation hub device, is within sufficient wireless signal range of the home automation hub includes a yellow visual indication if it is inconclusive whether the current location of the remote-control device is within the sufficient wireless signal range of the home automation hub.

14. The remote-control device of claim 1 wherein the indication of whether a current location of the remote-control device, based on the wireless signal quality between the remote-control device and the home automation hub device, is within sufficient wireless signal range of the home automation hub includes a bar chart indicating different levels of signal quality in which a first particular quality level on the bar chart is associated with the remote-control device being within sufficient wireless signal range of the home automation hub and a second lower particular level on the bar chart is associated with the remote-control device not being within sufficient wireless signal range of the home automation hub.

15. The remote-control device of claim 1 wherein the detection of whether a wireless signal is able to be received by the remote-control device from a home automation hub device over a wireless communication channel at a current location of the remote-control device is in response to a button being pressed on the remote-control device to initiate a signal test.

16. The remote-control device of claim 15 wherein the system control module is further configured to:
until user input is received via one of the input controls positioned on the housing to stop the detection, continuously perform the detection of whether the wireless signal is able to be received by the remote-control device from a home automation hub device over a wireless communication channel at a current location of the remote-control device and continuously cause the indicator to indicate whether a current location of the remote-control device is within sufficient wireless signal range of the home automation hub such that if a home automation device were to be installed at the current location of the remote-control device, the home automation hub would be able to communicate with and control the home automation device over the wireless communication channel.

17. A method for controlling operation of a remote-control device comprising:
receiving, by a system control module of the remote-control device, input including a command to initiate detection of a wireless signal quality between the remote-control device and a home automation hub device, wherein the remote-control device is a remote-control device of the home automation hub device;

in response to receiving the command, detecting, by the system control module of the remote-control device, wireless signal quality between the remote-control device and the home automation hub device over a wireless signal channel;

indicating on the remote-control device, by the system control module of the remote-control device, whether the detected wireless signal quality is sufficient for the home automation hub to be able to communicate with and control, over the wireless signal channel, a home automation device to be located at the current location of the remote control device based on the detected wireless signal quality;

receiving, by the system control module of the remote-control device, user input at the remote control device to cause the home automation hub device to cause a menu for controlling home automation devices to be displayed on a television along with a television program being displayed on the television; and sending, by the system control module of the remote-control device, a remote control command to the home automation hub device to cause the home automation hub device to cause a menu for controlling home automation devices to be displayed on the television along with the television program being displayed on the television.

18. The method of claim 17 wherein the wireless signal channel includes at least one wireless repeater device between the home automation device and the remote-control device.

19. A non-transitory computer readable storage medium having computer executable instructions thereon, that when executed by a computer processor cause the following method for controlling operation of a remote-control device to be performed:

determining whether a wireless signal is able to be received by the remote-control device directly from a home automation hub device, wherein the remote-control device is a remote-control device of the home automation hub device;

if a wireless signal is able to be received by the remote-control device directly from the home automation hub device, then determine a signal quality of the wireless signal received by the remote-control device directly from the home automation hub device and indicate, on the remote-control device, the signal quality of the wireless signal received by the remote-control device directly from the home automation hub device to indicate whether the home automation hub device would be able to communicate with and control a home automation device to be located at a current location of the remote-control device;

if a wireless signal is not able to be received by the remote-control device directly from the home automation hub device at the current location of the remote-control device, then search for a wireless signal from a repeater device that is connected to the home automation hub and through which a signal is able to be received by the remote-control device from the home automation hub device; and if the wireless signal is found from the repeater device that is connected to the home automation hub, then determine a signal quality of the wireless signal from the repeater device and indicate, on the remote-control device, the signal quality of the wireless signal from the repeater device to indicate whether the home automation hub would be able to communicate with and control, via the repeater, the home automation device to be located at the current location of the remote-control device;

receiving user input at the remote control device to cause the home automation hub device to cause a menu for controlling home automation devices to be displayed on a television along with a television program being displayed on the television; and sending a remote control command to the home automation hub device to cause the home automation hub device to cause a menu for controlling home automation devices to be displayed on the television along with the television program being displayed on the television.

20. The computer readable storage medium of claim 19 wherein the computer executable instructions, when executed by a computer processor, further cause the computer processor to:

for different locations of the remote-control device repeat:
    the determining whether a wireless signal is able to be received by the remote-control device directly from a home automation hub device;
    if a wireless signal is able to be received by the remote-control device directly from the home automation hub device, the determining a signal quality of the wireless signal received by the remote-control device directly from the home automation hub device and indicating, on the remote-control device, the signal quality of the wireless signal received by the remote-control device directly from the home automation hub device to indicate whether the home automation hub device would be able to communicate with and control a home automation device to be located at a current location of the remote-control device;
    if a wireless signal is not able to be received by the remote-control device directly from the home automation hub device at the current location of the remote-control device, the searching for a wireless signal from a repeater device that is connected to the home automation hub and through which a signal is able to be received by the remote-control device from the home automation hub device; and
    if the wireless signal is found from the repeater device that is connected to the home automation hub, the determining a signal quality of the wireless signal from the repeater device and indicating, on the remote-control device, the signal quality of the wireless signal from the repeater device to indicate whether the home automation hub would be able to communicate with and control, via the repeater, the home automation device to be located at the current location of the remote-control device.

21. The computer readable storage medium of claim 19 wherein the home automation device is selected form the group consisting of: a camera, a thermostat, a light fixture, a door sensor, a window sensor, a power outlet, a light switch, a doorbell, a doorbell sensor, a light bulb, a motion sensor, an electrical switch, an appliance switch, window covering control device, an alarm, a dimmer switch and a door lock.

* * * * *